United States Patent
Higa et al.

(10) Patent No.: US 7,586,575 B2
(45) Date of Patent: Sep. 8, 2009

(54) LIQUID CRYSTAL DEVICE AND ELECTRONIC APPARATUS

(75) Inventors: Masakatsu Higa, Chino (JP); Joji Nishimura, Matsumoto (JP)

(73) Assignee: Epson Imaging Devices Corporation, Azumino (JP)

( * ) Notice: Subject to any disclaimer, the term of this patent is extended or adjusted under 35 U.S.C. 154(b) by 317 days.

(21) Appl. No.: 11/524,254

(22) Filed: Sep. 21, 2006

(65) Prior Publication Data

US 2007/0109473 A1   May 17, 2007

(30) Foreign Application Priority Data

Nov. 14, 2005   (JP) ............... 2005-328440

(51) Int. Cl.
*G02F 1/1343* (2006.01)
(52) U.S. Cl. ................. 349/144; 349/146
(58) Field of Classification Search ........... 349/114, 349/144, 146, 38
See application file for complete search history.

(56) References Cited

U.S. PATENT DOCUMENTS

| | | | |
|---|---|---|---|
| 6,195,140 B1 | 2/2001 | Kubo et al. | |
| 6,295,109 B1 | 9/2001 | Kubo et al. | |
| 6,330,047 B1 | 12/2001 | Kubo et al. | |
| 6,452,654 B2 | 9/2002 | Kubo et al. | |
| 6,819,379 B2 | 11/2004 | Kubo et al. | |
| 6,950,159 B2 | 9/2005 | Kubo et al. | |
| 7,151,581 B2 | 12/2006 | Kubo et al. | |
| 7,379,137 B2 | 5/2008 | Kubo | |
| 7,379,528 B2 * | 5/2008 | Mattson et al. | 378/19 |
| 7,468,768 B2 | 12/2008 | Kubo et al. | |
| 2005/0001947 A1 * | 1/2005 | Ogishima et al. | 349/47 |
| 2005/0140876 A1 * | 6/2005 | Kubo | 349/114 |
| 2007/0002227 A1 | 1/2007 | Kubo et al. | |
| 2007/0019138 A1 | 1/2007 | Kubo et al. | |

FOREIGN PATENT DOCUMENTS

JP    A 11-101992    4/1999

(Continued)

OTHER PUBLICATIONS

Makoto Jisaki et al., "Development of Transflective LCD for High Contrast and wide Viewing Angle by Using Homeotropic Alignment," Asia Display/ IDW '01, pp. 133-136 (2001).

(Continued)

*Primary Examiner*—Frank G Font
*Assistant Examiner*—Eric Wong
(74) *Attorney, Agent, or Firm*—Oliff & Berridge, PLC

(57) ABSTRACT

A liquid crystal device includes a pair of substrates and a liquid crystal layer held between the substrates and containing a liquid crystal having negative dielectric anisotropy. The liquid crystal layer includes subpixels, each including a plurality of transmissive display regions and a reflective display region that are arranged in a predetermined direction. The transmissive display regions are disposed at the ends of each subpixel in the direction in which the transmissive and reflective display regions are arranged. The liquid crystal device further includes a thickness-adjusting layer disposed between at least one of the substrates and the liquid crystal layer so that the liquid crystal layer is thinner in the reflective display region than in the transmissive display regions.

13 Claims, 8 Drawing Sheets

FOREIGN PATENT DOCUMENTS

| | | |
|---|---|---|
| JP | A 11-242226 | 9/1999 |
| JP | A 2000-47217 | 2/2000 |
| JP | A 2004-020610 | 1/2004 |
| JP | 2004-258507 | 9/2004 |
| JP | 2005-134642 | 5/2005 |
| JP | 2005-250431 A | 9/2005 |
| JP | 2005-258183 A | 9/2005 |

OTHER PUBLICATIONS

Masakatsu Higa et al, U.S. Appl. No. 11/298,839, filed Dec. 12, 2005.

* cited by examiner

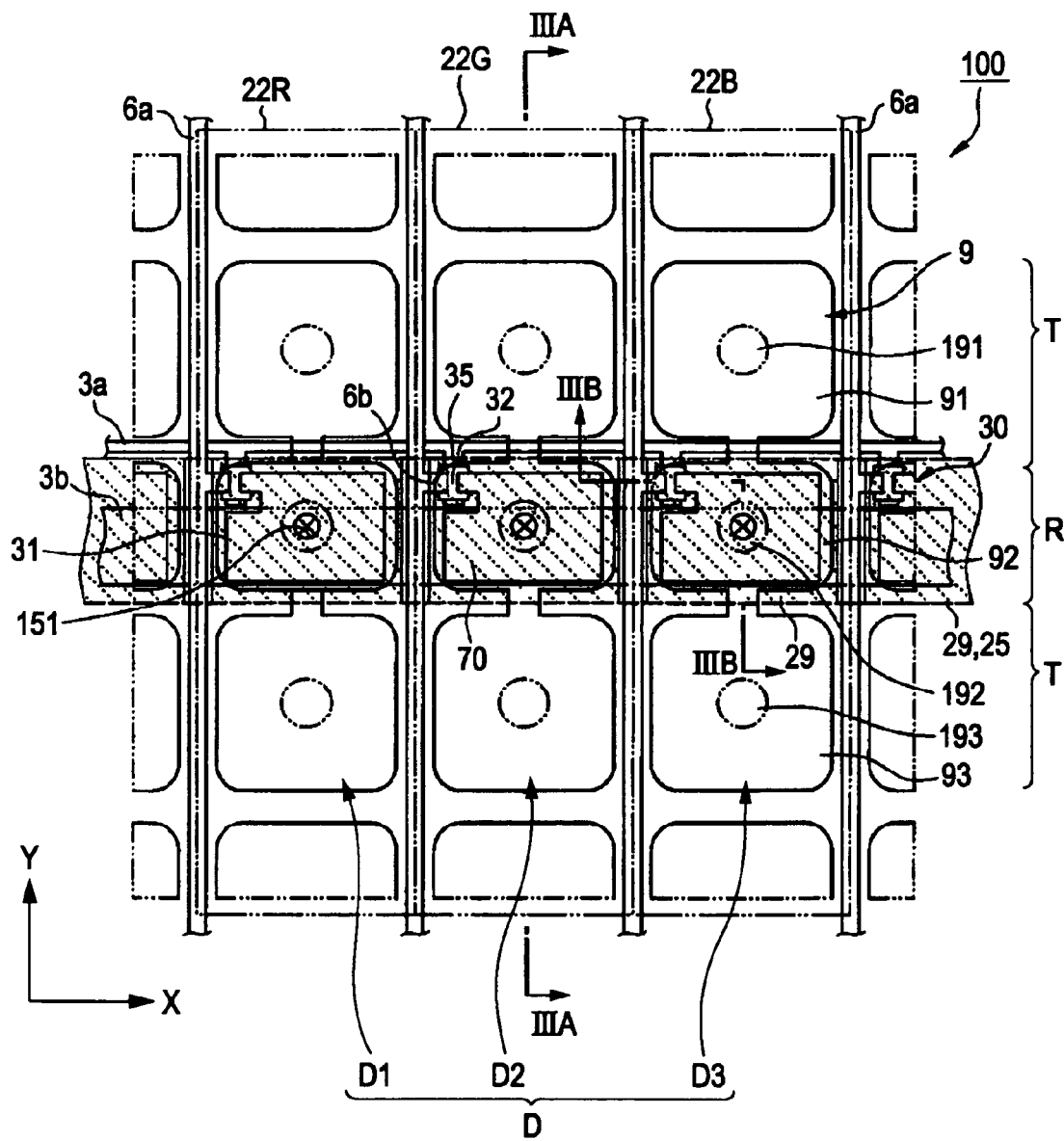

LIQUID CRYSTAL DEVICE AND ELECTRONIC APPARATUS

BACKGROUND

1. Technical Field

The present invention relates to liquid crystal devices and electronic apparatuses.

2. Related Art

Among known liquid crystal devices are transflective liquid crystal devices, which operate in both reflective mode and transmissive mode. JP-A-2000-047217, for example, proposes a transflective liquid crystal device having a multigap structure, in which the thickness of a liquid crystal layer differs between reflective display regions and transmissive display regions to enhance contrast. Another type of transflective liquid crystal device includes a homeotropic liquid crystal to improve viewing-angle characteristics (see, for example, "Development of transflective LCD for high contrast and wide viewing angle by using homeotropic alignment", M. Jisaki et al., Asia Display/ID W'01, pp. 133-136 (2001)).

The homeotropic liquid crystal device above includes protrusions disposed in the centers of transmissive display regions to control the direction in which liquid crystal molecules are tilted in the regions. The above reference, however, does not mention how to control the direction in which the liquid crystal molecules are tilted in reflective display regions. Irregularly tilted liquid crystal molecules leave discontinuous lines at the boundaries between different liquid crystal domains. Such discontinuous lines are called disclinations, which can cause problems such as afterimage. In addition, the liquid crystal domains have different viewing-angle characteristics and thus undesirably show grainy, stain-like irregularities in a displayed image when the liquid crystal device is viewed obliquely.

A homeotropic liquid crystal device having a multigap structure, on the other hand, disadvantageously tends to cause misalignment at steps formed between transmissive display regions and reflective display regions. In particular, the misalignment can be promoted by variations in the potentials of pixel-switching elements, such as thin-film diodes (TFDs) and thin-film transistors (TFTs), and wiring connected thereto if they are disposed near the steps. These steps can be covered two-dimensionally with a light-shielding film to prevent a decrease in contrast due to the misalignment of liquid crystal molecules at the steps, although the film undesirably decreases the aperture ratio of pixels and thus darkens the display.

SUMMARY

An advantage of the invention is that it provides a homeotropic liquid crystal device having a multigap structure with high brightness and high contrast.

A liquid crystal device according to an aspect of the invention includes a pair of substrates and a liquid crystal layer held between the substrates and containing a liquid crystal having negative dielectric anisotropy. The liquid crystal layer includes subpixels, each including a plurality of transmissive display regions and a reflective display region that are arranged in a predetermined direction. The transmissive display regions are disposed at the ends of each subpixel in the direction in which the transmissive and reflective display regions are arranged. The liquid crystal device further includes a thickness-adjusting layer disposed between at least one of the substrates and the liquid crystal layer so that the liquid crystal layer is thinner in the reflective display region than in the transmissive display regions.

This liquid crystal device can provide a wide-viewing-angle display because the liquid crystal having negative dielectric anisotropy is aligned perpendicularly to the surfaces of the substrates. In addition, the thickness-adjusting layer can eliminate the difference in retardation between the transmissive display regions and the reflective display region to achieve high contrast for both transmissive display and reflective display. Furthermore, the transmissive display regions are disposed at the ends of each subpixel in the direction in which the transmissive and reflective display regions are arranged. Thus, tapered steps formed on the thickness-adjusting layer between the transmissive and reflective display regions are not located at the boundaries between the subpixels adjacent in the direction in which the transmissive and reflective display regions are arranged. Liquid crystal molecules located at the tapered steps are inclined with respect to the direction normal to the substrates. Such liquid crystal molecules are largely tilted by the action of transverse electric fields occurring between the subpixels adjacent in the longitudinal direction thereof as compared to those aligned in the direction normal to the substrates. This results in larger light leakage. According to the aspect of the invention, by contrast, the liquid crystal molecules located at the tapered steps are less susceptible to the transverse electric fields because the tapered steps are separated from the areas where the transverse electric fields occur. The transverse electric fields act on liquid crystal molecules located in areas where the liquid crystal layer has a uniform thickness, although the molecules cause little light leakage in such areas. The liquid crystal device according to the aspect of the invention can thus effectively prevent light leakage at the boundaries between the subpixels to provide a high-contrast display.

According to the technical idea of separating the tapered steps from the boundaries between the subpixels, the thickness-adjusting layer can also be disposed across the boundaries between the subpixels adjacent in the longitudinal direction so that the reflective display regions are located at the ends of the subpixels in the longitudinal direction. If such a structure is applied to transflective liquid crystal devices, in which the area of transmissive display region is larger than that of reflective display region in each subpixel, the reflective display region is divided in two regions on both sides of the transmissive display region. Such divided reflective display regions have been found to have a low reflectance relative to the area thereof and thus decrease the substantial aperture ratio of the liquid crystal devices. According to the aspect of the invention, by contrast, each subpixel includes the divided transmissive display regions and the single reflective display region, which can have the reflectance corresponding to the area thereof. The structure according to the aspect of the invention is thus suitable for liquid crystal devices in which the total area of reflective display region is smaller than that of transmissive display region in each subpixel.

The liquid crystal device according to the aspect of the invention preferably further includes a pixel drive unit that drives the subpixels by applying signals of opposite polarities to the subpixels adjacent in the direction in which the transmissive and reflective display regions are arranged. For example, the liquid crystal device preferably drives the subpixels by line inversion driving or dot inversion driving. Such driving methods effectively prevent flicker and crosstalk to provide a high-quality display. In line inversion driving or dot inversion driving, transverse electric fields occur between the subpixels corresponding to the adjacent lines. According to the aspect of the invention, as described above, the tapered steps of the thickness-adjusting layer are separated from the areas where the transverse electric fields occur, where the thickness-adjusting layer has a uniform thickness. The liquid crystal device can therefore avoid misalignment due to the action of the transverse electric fields to provide a high-contrast display in line inversion driving and dot inversion driving.

The liquid crystal device according to the aspect of the invention preferably further includes island electrodes electrically connected to each other and corresponding to the individual display regions. This structure allows the division of domains according to the shapes of the island electrodes to successfully control the direction in which liquid crystal molecules are tilted, thus providing a high-contrast, wide-viewing-angle display.

The liquid crystal device according to the aspect of the invention preferably further includes alignment control members corresponding to the individual island electrodes to control the alignment of the liquid crystal layer. The alignment control members are preferably disposed substantially in the centers of the island electrodes to accurately tilt the liquid crystal molecules in all directions around the alignment control members. The liquid crystal device can therefore provide excellent visibility with no stain-like irregularities.

The liquid crystal device according to the aspect of the invention may further include a plurality of signal lines disposed on one of the substrates so as to extend in the direction in which the transmissive and reflective display regions are arranged and pixel-switching elements disposed in the reflective display regions of the subpixels to electrically connect the signal lines to the subpixels. That is, the liquid crystal device may be of active-matrix type. This liquid crystal device can prevent a decrease in pixel aperture ratio to provide bright display because the areas where the pixel-switching elements are disposed, which are light-shielding areas, can be located in the reflective display regions to electrically connect the signal lines to the subpixels.

The liquid crystal device may further include conductive connection portions that electrically connect the pixel-switching elements to the island electrodes in the reflective display regions. The conductive connection portions preferably overlap two-dimensionally with the alignment control members in the reflective display regions. The conductive connection portions and the alignment control members, which usually do not contribute to display, may be arranged so that they overlap two-dimensionally with each other. This arrangement prevents a decrease in pixel aperture ratio to provide bright display.

In the liquid crystal device, preferably, the conductive connection portions and the alignment control members are disposed substantially in the centers of the island electrodes in the reflective display regions to accurately tilt the liquid crystal molecules in all directions around the alignment control members. The liquid crystal device can therefore provide a high-contrast, wide-viewing-angle display.

Also, the liquid crystal device according to the aspect of the invention may further include a plurality of signal lines disposed on one of the substrates so as to extend in the direction in which the transmissive and reflective display regions are arranged; two-terminal nonlinear pixel-switching elements disposed on the substrate in the reflective display regions of the subpixels and electrically connected to the island electrodes to electrically connect the signal lines to the subpixels; and counter electrodes that are disposed on the other substrate opposite the island electrodes with the subpixels defined therebetween and that are arranged in a stripe pattern. That is, the liquid crystal device may also be of TFD active-matrix type.

In this case, the counter electrodes are arranged in a stripe pattern at intervals, where transverse electric fields occur. The liquid crystal layer has a uniform thickness in these intervals because they are located between the transmissive display regions. The liquid crystal device thus causes little light leakage due to the transverse electric fields. In addition, the liquid crystal device can effectively prevent a decrease in contrast due to light leakage because the tapered steps, where larger light leakage occurs under the action of the transverse electric fields, are separated from the areas where the transverse electric fields occur.

The liquid crystal device preferably further includes a pixel drive unit that drives the subpixels by inputting signals of opposite polarities to the counter electrodes adjacent in the direction in which the signal lines extend. Such a driving method prevents flicker to provide excellent visibility.

Also, the liquid crystal device according to the aspect of the invention may further include a plurality of first signal lines disposed on one of the substrates so as to extend in the direction in which the transmissive and reflective display regions are arranged; a plurality of second signal lines disposed on the substrate so as to extend across the first signal lines; thin-film transistors disposed at positions on the substrate which correspond to intersections of the first and second signal lines in the reflective display regions of the subpixels and electrically connected to the island electrodes to electrically connect the first signal lines to the subpixels; and a common electrode disposed on the other substrate opposite the island electrodes with the subpixels defined therebetween. That is, the liquid crystal device may also be of TFT active-matrix type.

The liquid crystal device preferably further includes a pixel drive unit that drives the subpixels by inputting signals of opposite polarities to the adjacent second signal lines, which are connected to the gates of the thin-film transistors. Alternatively, the liquid crystal device preferably further includes a pixel drive unit that drives the subpixels by inputting signals of opposite polarities to any subpixel and the subpixels adjacent thereto in the direction in which the first signal lines extend and in the direction in which the second signal lines extend. Such driving methods prevent flicker to provide excellent visibility.

The liquid crystal device according to the aspect of the invention preferably further includes an interlayer insulating film disposed between the island electrodes and the pixel-switching elements on the substrate on which the signal lines are disposed. This interlayer insulating film has a contact hole penetrating the film to electrically connect the pixel-switching elements to the island electrodes. The interlayer insulating film underlying the pixel-switching elements can eliminate the effect of electric fields generated from the pixel-switching elements and form a flat surface over irregularities on the surface of the substrate due to the pixel-switching elements. The interlayer insulating film can therefore allow the liquid crystal layer to have a uniform thickness for accurate drive control, thus providing excellent display.

An electronic apparatus according to an embodiment of the invention includes the liquid crystal device according to the aspect of the invention. The liquid crystal device can serve as a display capable of providing a bright, high-contrast display in both reflective mode and transmissive mode.

BRIEF DESCRIPTION OF THE DRAWINGS

The invention will be described with reference to the accompanying drawings, wherein like numbers reference like elements.

FIG. 2 is a plan view of subpixels of the liquid crystal device.

DESCRIPTION OF EXEMPLARY EMBODIMENTS

First Embodiment

Figure 1:
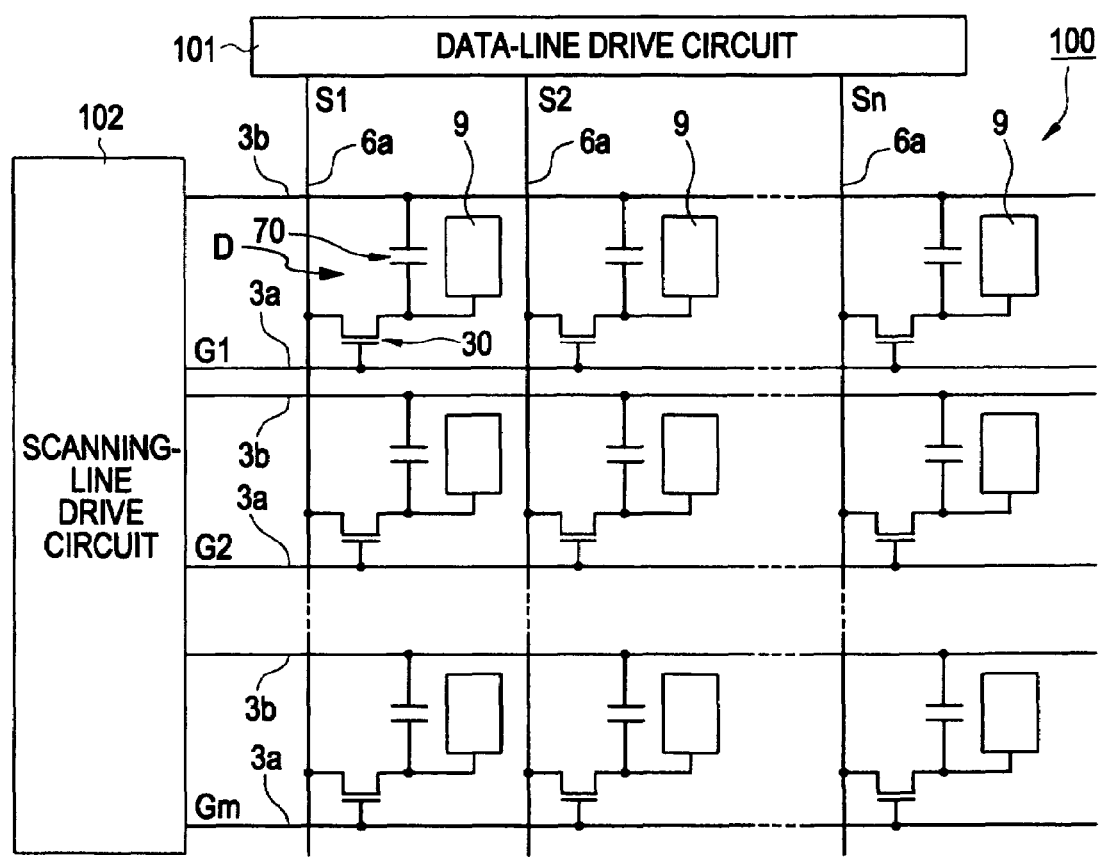
FIG. 1 is a circuit diagram of a liquid crystal device according to a first embodiment of the invention.

A liquid crystal device according to a first embodiment of the invention will now be described with reference to the drawings. The liquid crystal device is an active-matrix liquid crystal device of vertically aligned nematic (VAN) mode, including a liquid crystal with negative dielectric anisotropy which is aligned perpendicularly to the surfaces of substrates. The alignment of the liquid crystal is controlled by applying an electric field thereto to perform image display. This liquid crystal device is a transflective liquid crystal device including subpixels having reflective and transmissive display regions. The liquid crystal device has red (R), green (G), and blue (B) color filters (coloring layers) provided on one of the substrates to enable color display. Each pixel includes three subpixels that emit R light, G light, and B light. In the present specification, the term "subpixel" refers to the minimum display unit, and the term "pixel" refers to a display region including a set of subpixels corresponding to R, G, and B. It should be noted that components such as layers are illustrated on different scales in the drawings for convenience of illustration.

Figure 3A:
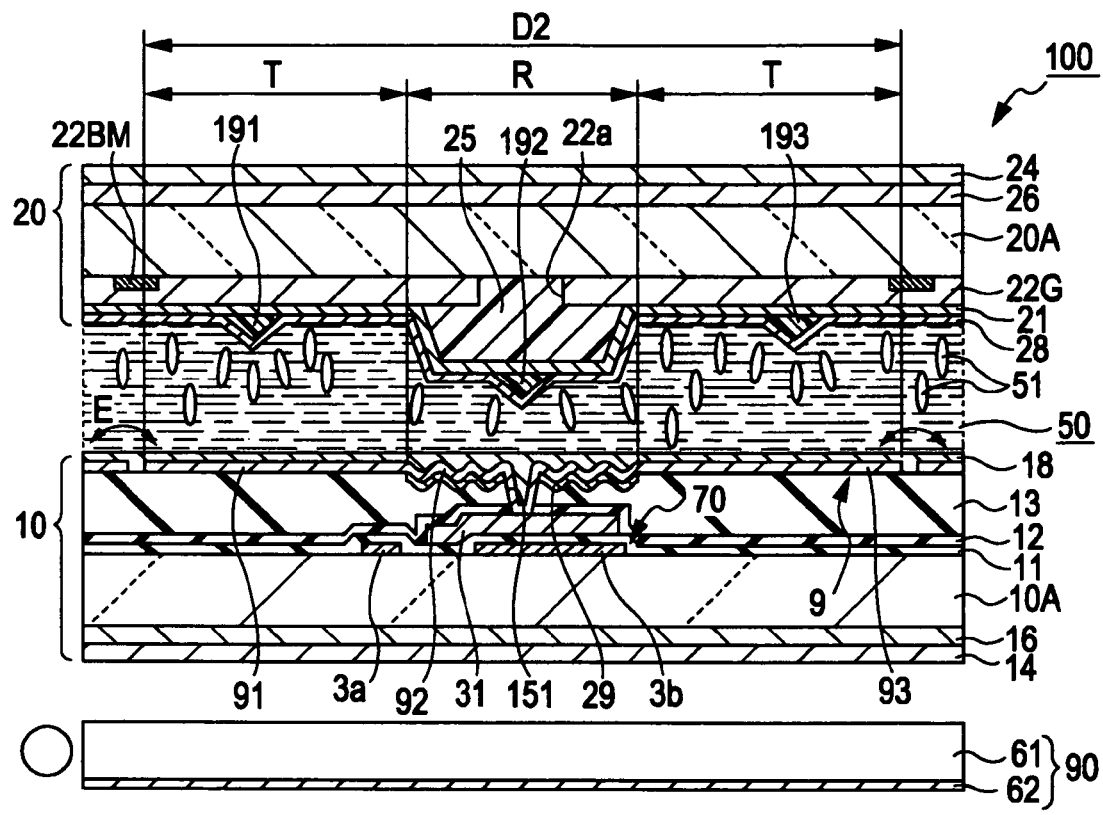
FIGS. 3A and 3B are sectional views of the subpixels and a TFT, respectively, shown in FIG. 2.
Figure 3B:
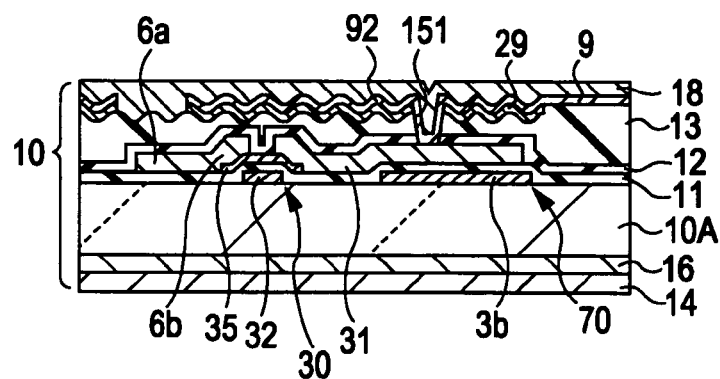
Figure 4:
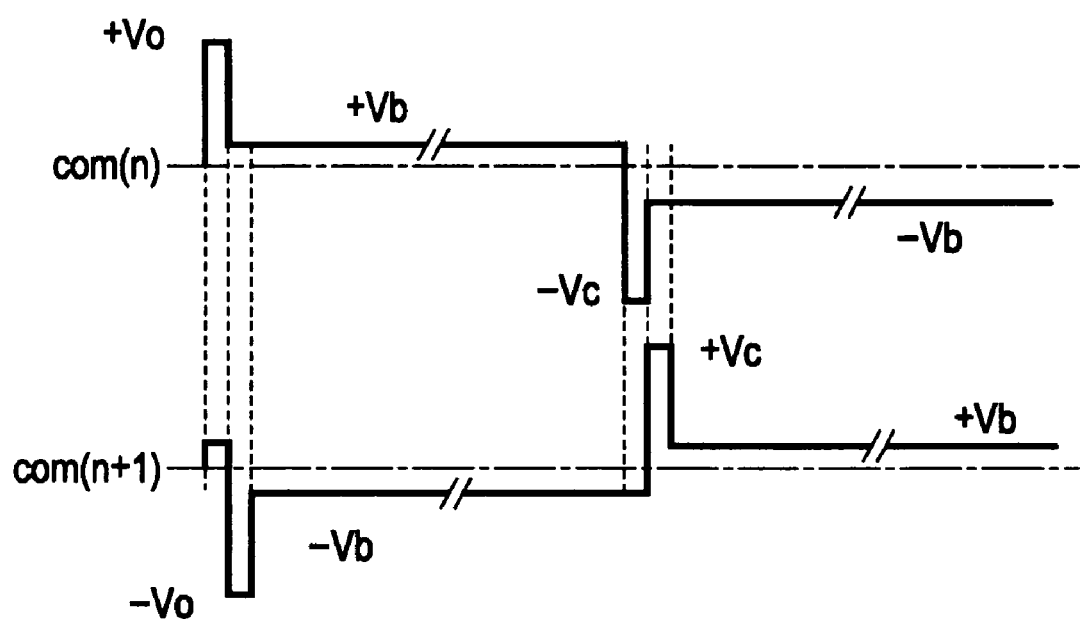
FIG. 4 is a waveform graph of scanning signals for illustrating an example of a driving method.

FIG. 1 is a circuit diagram illustrating a matrix of pixels of the liquid crystal device according to this embodiment. FIG. 2 is a plan view of three subpixels included in any pixel of the liquid crystal device. FIGS. 3A and 3B are partial sectional views taken along lines IIIA-IIIA and IIIB-IIIB, respectively, in FIG. 2. FIG. 4 is a waveform graph of scanning signals for horizontal line inversion driving of the liquid crystal device according to this embodiment.

Referring to FIG. 1, a liquid crystal device 100 has an image display region composed of a matrix of subpixels. Each subpixel includes a pixel electrode 9 and a TFT 30 for switching the pixel electrode 9. A data-line drive circuit 101 supplies image signals S1 to Sn to the subpixels via data lines 6a. The data lines 6a extend from the data-line drive circuit 101 and are electrically connected to the sources of the TFTs 30. The image signals S1 to Sn may be supplied sequentially or in units of groups of the adjacent data lines 6a. A scanning-line drive circuit 102 supplies scanning signals G1 to Gm to the subpixels via scanning lines 3a in the form of pulses at predetermined timings. The scanning lines 3a extend from the scanning-line drive circuit 102 and are electrically connected to the gates of the TFTs 30. The scanning signals G1 to Gm are sequentially supplied to the gates of the TFTs 30. The pixel electrodes 9 are electrically connected to the drains of the TFTs 30. The TFTs 30 are turned on for a predetermined period by the input of the scanning signals G1 to Gm so that the image signals S1 to Sn can be supplied from the data lines 6a to the pixel electrodes 9 at predetermined timings.

The image signals S1 to Sn are input to the liquid crystal through the pixel electrodes 9 and are held between the pixel electrodes 9 and a common electrode disposed opposite the pixel electrodes 9 with the liquid crystal disposed therebetween for a predetermined period. Storage capacitors 70 are disposed between the drains of the TFTs 30 and capacitor lines 3b in parallel with the liquid crystal to prevent the leakage of the image signals S1 to Sn.

Next, the structure of the liquid crystal device 100 will be described in detail with reference to FIGS. 2, 3A, and 3B. Referring to FIG. 3A, the liquid crystal device 100 includes a TFT array substrate (first substrate) 10, a counter substrate (second substrate) 20, and a liquid crystal layer 50 held therebetween. The liquid crystal layer 50 is sealed between the two substrates 10 and 20 with a sealant (not shown) provided along the edges of a region where the two substrates 10 and 20 face each other. A backlight (illumination unit) 90 including a light guide plate 61 and a reflective plate 62 is provided on the backside of the TFT array substrate 10 (on the bottom side in FIG. 3A).

FIG. 2 illustrates the pixels of the liquid crystal device 100, each including three subpixels D1 to D3. The subpixels D1 to D3 include the pixel electrodes 9 and the TFTs 30. The data lines 6a extend in the longitudinal direction of the pixel electrodes 9 (in the Y-axis direction) while the scanning lines 3a extend across the pixel electrodes 9 (in the X-axis direction). The data lines 6a and the scanning lines 3a are electrically connected to the TFTs 30 near the intersections thereof. The subpixels D1 to D3 are provided with color filters of the three primary colors, namely, a red color filter 22R, a green color filter 22G, and a blue color filter 22B, respectively, which are formed in a stripe pattern extending in the Y-axis direction. The color layers 22R, 22G, and 22B extend over columns of subpixels in the Y-axis direction and are regularly arranged in a transverse direction.

The pixel electrodes 9 are formed of a transparent conductive film such as an indium tin oxide (ITO) film. In each of the subpixels D1 to D3, the pixel electrode 9 is substantially divided into three island portions 91 to 93. A coupling portion couples the adjacent island portions 91 and 92 in the center therebetween, and another coupling portion couples the adjacent island portions 92 and 93 in the center therebetween. A reflective layer 29 is disposed so as to overlap two-dimensionally with the central island portion 92. The reflective layer 29 is formed of, for example, a reflective metal film such as an aluminum (Al) film or a silver (Ag) film. The reflective layer 29 and the island portion 92 disposed thereon function as a reflection electrode of the subpixel; that is, the region where the island portion 92 is formed corresponds to a reflective display region R. The reflection electrode has an irregular surface that reflects and scatters light, thus providing display with high visibility.

On the other hand, the areas where the other island portions 91 and 93 are formed correspond to transmissive display regions T. That is, each subpixel D includes the reflective display region R and the two transmissive display regions T. Less than one-third of the area of the image display region contributes to reflective display while the other area, more than two-thirds, contributes to transmissive display. In each of the subpixels D1 to D3, the island portion 91 corresponding to one transmissive display region T, the island portion 92 corresponding to the reflective display region R, and the island portion 93 corresponding to the other transmissive display region T are arranged in the longitudinal direction in the above order. The two transmissive display regions T are disposed at the ends of the subpixel with the reflective display region R provided therebetween.

The coupling portions of the pixel electrodes 9 contribute to transmissive display because they are formed of a transparent conductive film such as an ITO film. Dielectric protrusions 191 to 193 are disposed substantially in the centers of the island portions 91 to 93, respectively, to control the alignment of the liquid crystal. The island portions 91 to 93 have a curved shape with the corners thereof rounded, although they may also have a substantially octagonal shape with the corners thereof beveled.

The TFTs 30 are surrounded by the central island portions 92, the scanning lines 3a, and the data lines 6a. The TFTs 30 each include a semiconductor layer 35, a gate electrode 32 disposed below the semiconductor layer 35 (on the base 10A side), and a source electrode 6b disposed above the semiconductor layer 35. The drain of the TFT 30 is electrically connected to a capacitor electrode 31 that has a substantially rectangular shape in plan view and overlaps two-dimensionally with the island portion 92. The semiconductor layer 35 has a channel region adjacent to the gate electrode 32, and also has a source region (on the source electrode 6b side) and a drain region (on the capacitor electrode 31 side) which are separated by the channel region.

The gate electrode 32 is formed by extending a branch of the scanning lines 3a in the direction in which the data lines 6a extend. The leading end of the gate electrode 32 is positioned opposite the semiconductor layer 35 with an insulating film (not shown) disposed therebetween. The source electrode 6b is formed by extending a branch of the data lines 6a in the direction in which the scanning lines 3a extend. The source electrode 6b is electrically connected to the source region of the semiconductor layer 35 so as to cover the source region. The corner of the capacitor electrode 31 adjacent to the TFT 30 is partially extended and electrically connected to the drain region of the semiconductor layer 35 so as to cover the drain region.

The capacitor electrodes 31 are electrically connected to the island portions 92 (pixel electrodes 9) corresponding to the reflective display regions R via pixel contact holes 151 provided in the centers of the capacitor electrodes 31. The storage capacitors 70 of the subpixels D1 to D3 are formed in areas where the capacitor electrodes 31 overlap two-dimensionally with the capacitor line 3b extending across the capacitor electrodes 31 in the X-axis direction. Thus, the island portions 92 (pixel electrodes 9) are electrically connected to the TFTs 30 via the pixel contact holes 151. The scanning line 3a connected to the TFTs 30 of the subpixels D1 to D3 is formed in the subpixels D1 to D3 so as to extend perpendicularly to the longitudinal direction thereof beside the reflective display regions R (or through the reflective display regions R).

The TFTs 30 are turned on for a predetermined period by the input of gate signals through the scanning lines 3a so that the image signals S1 to Sn can be supplied from the data lines 6a to the liquid crystal at predetermined timings.

Referring to FIG. 3A, the liquid crystal device 100 includes the TFT array substrate 10 and the counter substrate 20 with the liquid crystal layer 50 held therebetween. The liquid crystal layer 50 is formed of an initially homeotropically aligned liquid crystal having negative dielectric anisotropy (with a refractive index anisotropy Δn of, for example, 0.1). The thickness of the liquid crystal layer 50 differs between different parts of the area where the pixel electrode 9 is formed. Specifically, a thickness-adjusting layer 25 is provided on the inner surface of the counter substrate 20 in the area corresponding to the reflective display region R so that the thickness of the liquid crystal layer 50 in the reflective display region R is substantially half that of the liquid crystal layer 50 in the transmissive display regions T. Homeotropically aligned liquid crystal molecules 51 are conceptually illustrated in a substantially rod-like, elliptical shape.

The TFT array substrate 10 includes a base 10A formed of a transparent material such as quartz or glass. The scanning lines 3a and the capacitor lines 3b are formed on the inner surface of the base 10A (on the liquid crystal layer 50 side) and are covered with an insulating film (gate insulating film) 11. The capacitor electrodes 31 are formed on the insulating film 11 at the same height as, for example, the data lines 6a (see FIG. 2). A first interlayer insulating film 12 covers the capacitor electrodes 31. The first interlayer insulating film 12 is formed of, for example, a silicon nitride film and protects the individual conductive films constituting the TFTs 30. A second interlayer insulating film 13 covers the first interlayer insulating layer 12. The second interlayer insulating film 13 is formed of, for example, a transparent resin and also functions to form a flat surface over the surface of the base 10A where the TFTs 30 are formed. In this embodiment, particularly, the second interlayer insulating film 13 has an irregular region on the surface thereof where the reflective layer 29 is formed. The reflective layer 29 thus has an irregular surface similar to the irregular surface of the second interlayer insulating film 13 to function as a light-scattering reflective layer.

The pixel electrode 9 is formed on the second interlayer insulating film 13 and the reflective layer 29. The pixel electrode 9 is partially embedded in the pixel contact hole 151, which penetrates the first interlayer insulating film 12, the second interlayer insulating film 13, and the reflective layer 29 to reach the capacitor electrode 31. The pixel electrode 9 is thus electrically connected to the capacitor electrode 31 through the pixel contact hole 151. A homeotropic alignment film 18 covers the pixel electrode 9 so that the liquid crystal molecules 51 are initially aligned perpendicularly to the surfaces of the substrates 10 and 20. The homeotropic alignment film 18 is formed of, for example, polyimide. A retardation plate 16 and a polarizer 14 are disposed on the outer surface of the base 10A.

FIG. 3B is a partial sectional view of the TFT array substrate 10, illustrating the sectional structure of the TFT 30. The gate electrode 32 and the capacitor line 3b are formed on the base 10A and are covered with the insulating film 11. The semiconductor layer 35 is formed opposite the gate electrode 32 with the insulating film 11 disposed therebetween. The source electrode 6b and the capacitor electrode 31 are formed on the insulating film 11 so as to partially cover the semiconductor layer 35. The capacitor electrode 31 is disposed opposite the capacitor line 3b in the thickness direction with the insulating film 11 disposed therebetween to form the storage capacitor 70. The insulating film 11 thus serves both as the gate insulating film for the TFT 30 and as the dielectric film for the storage capacitor 70.

The counter substrate 20 includes a base 20A formed of a transparent material such as quartz or glass. The color filter 22G (22R or 22B) is disposed on the inner surface of the base 20A so as to extend over the reflective display region R and the transmissive display regions T. The color filters 22R, 22G, and 22B, as described above, are arranged in a stripe pattern extending in the longitudinal direction of the subpixels D1 to D3 (in the Y-axis direction in FIG. 2). A light-shielding layer (black matrix) 22BM extends along the boundaries between the color filters 22R, 22G, and 22B and those between the subpixels D adjacent in the longitudinal direction thereof. The light-shielding layer 22BM is formed of, for example, a black resin.

In FIG. 3A, the color filter 22G has a rectangular opening (uncolored region) 22a formed at the position corresponding to the center of the island portion 92 for reflective display. Preferably, the ratio of the area of the uncolored region to that of the colored region is appropriately determined for each of R, G, and B with consideration given to the color balance therebetween. For example, the green color filter 22G may have the largest uncolored region among the color filters 22R, 22G, and 22B because green has high visibility; the red color filter 22R may have the second largest uncolored region, and the blue color filter 22B may have the smallest uncolored region.

The thickness-adjusting layer 25 is selectively formed on the inner surface of the color filter 22G in the area corresponding to the reflective display region R. In the plan view of FIG. 2, the thickness-adjusting layer 25, as well as the reflective layer 29, is formed in a strip shape extending in the X-axis direction. When viewed in plan, the thickness-adjusting layer 25 occupies substantially the same area as the reflective layer 29. The opening 22a provided in the reflective display region R is filled with the thickness-adjusting layer 25. The thickness-adjusting layer 25 is partially provided in the subpixels D1 to D3 so that the thickness of the liquid crystal layer 50 differs between the reflective display region R and the transmissive display regions T, thus forming a multigap structure for each subpixel D.

The thickness-adjusting layer 25 is formed of an organic film such as an acrylic resin film and has a thickness of, for example, about 2 µm±1 µm. The liquid crystal layer 50 has a thickness of about 2 to 6 µm in the area where the thickness-adjusting layer 25 is not present. The thickness of the liquid crystal layer 50 in the reflective display region R is substantially half that in the transmissive display regions T. This structure allows the liquid crystal device 100 to provide a bright, high-contrast display. Because the thickness of the thickness-adjusting layer 25 varies continuously, tapered steps are left near the boundaries between the reflective display region R and the transmissive display regions T. These tapered steps overlap two-dimensionally with the edges of the reflective layer 29 in the center of the dot region, and also overlap two-dimensionally with the coupling portions (strip-shaped electrode films) between the adjacent island portions 91, 92, and 93.

A counter electrode 21 is formed over the entire surfaces of the color filter 22G and the thickness-adjusting layer 25. The counter electrode 21 is formed of a transparent conductive film such as an ITO film. The dielectric protrusions 191 to 193 are provided on the counter electrode 21 opposite the pixel electrode 9 so as to extend toward the liquid crystal layer 50 side. The dielectric protrusions 191 to 193 illustrated in FIG. 3A have a substantially triangular shape in cross section, although they are gently curved in practice. The dielectric protrusions 191 and 193 are disposed at the positions corresponding to the centers of the two island portions 91 and 93, respectively, in the transmissive display regions T while the other dielectric protrusion 192 is disposed at the position corresponding to the center of the island portion 92 in the reflective display region R.

These dielectric protrusions 191 to 193 may be formed with a dielectric material such as resin by, for example, photolithography using a mask. For example, dielectric protrusions having a height of 1.2 µm and a diameter of 12 µm may be simultaneously formed in the reflective display region R and the transmissive display regions T with a novolac positive photoresist. The curved shape of the dielectric protrusions 191 to 193 may be formed by rounding the leading ends thereof through post-baking at about 220° C. after development of the resist. A homeotropic alignment film 28 covers the counter electrode 21 and the dielectric protrusions 191 to 193 so that the liquid crystal molecules 51 are initially aligned perpendicularly to the surfaces of the substrates 10 and 20. The homeotropic alignment film 28 is formed of, for example, polyimide.

A retardation plate 26 and a polarizer 24 are disposed on the outer surface of the base 20A. The polarizers 14 and 24 function to transmit only linearly polarized light vibrating in a predetermined direction. The retardation plates 16 and 26 used are $\lambda/4$ plates, which introduce a phase shift of substantially one-quarter the wavelength of visible light. The transmission axes of the polarizers 14 and 24 and the slow axes of the retardation plates 16 and 26 are arranged at about 45° from each other so that they function in cooperation as a circular polarizer. The retardation plate 16 and the polarizer 14 can convert linearly polarized light into circularly polarized light which enters the liquid crystal layer 50 while the retardation plate 26 and the polarizer 24 can convert the circularly polarized light exiting the liquid crystal layer 50 into linearly polarized light and output it. The transmission axes of the polarizers 14 and 24 are orthogonal to each other, and the slow axes of the retardation plates 16 and 26 are orthogonal to each other. A combination of a polarizer and a $\lambda/4$ plate is typically used as a circular polarizer, although a combination of a polarizer, a $\lambda/2$ plate, and a $\lambda/4$ plate may also be used as a wide-band circular polarizer to provide more achromatic black display.

The liquid crystal device 100 having the structure described above operates by horizontal line inversion driving in this embodiment. Referring to FIG. 4, the scanning signals (com) applied to the scanning lines 3a are reversed in polarity for each frame, and the scanning signals (com) applied to the scanning lines 3a adjacent in the direction in which the data lines 6a extend have opposite polarities. That is, the polarity of the nth scanning signal com(n) is always opposite that of the (n+1)th scanning signal com(n+1), and thus the scanning signals com applied to the subpixels D adjacent in the direction in which the data lines 6a extend always have opposite polarities. The liquid crystal device 100 can also operate by dot inversion driving, in which the scanning signals applied to the adjacent subpixels D have opposite polarities. Such driving methods allow the liquid crystal device 100 to provide a high-quality image with no flicker.

In the liquid crystal device 100 according to this embodiment, any subpixel D includes the transmissive display regions T at the ends thereof in the longitudinal direction, that is, in the direction in which the data lines 6a extend (in the Y-axis direction), with the reflective display region R disposed therebetween. Thus, the subpixels D are adjacently arranged in the Y-axis direction with the transmissive display regions T thereof facing each other. The liquid crystal layer 50 can have a substantially uniform thickness at the boundaries between the subpixels D because the edges of the thickness-adjusting layer 25, and thus the tapered steps thereof, are not located there.

The liquid crystal device 100, as described above, can operate by line inversion driving or dot inversion driving. In such driving, transverse electric fields E occur between the adjacent pixel electrodes 9 when an off voltage is applied, as shown in FIG. 3A. The transverse electric fields E largely tilt the liquid crystal molecules 51 and thus decrease contrast at the boundaries between the subpixels D if the tapered steps are located there. The thickness of the liquid crystal layer 50 varies at the tapered steps, where the liquid crystal molecules 51 are in a pretilted state. For the liquid crystal device 100 according to this embodiment, the tapered steps are not located at the boundaries between the subpixels D, where the liquid crystal layer 50 has a uniform thickness. The transverse electric fields E therefore do not largely tilt the liquid crystal molecules 51 at the boundaries. The liquid crystal device 100 can thus effectively prevent a decrease in contrast due to light leakage at the boundaries.

The tapered steps formed at the edges of the thickness-adjusting layer 25 are located between the adjacent island portions 91 and 92 and the adjacent island portions 92 and 93. The island portions 91 to 93 have the same potential because they are electrically connected to each other. In this embodiment, therefore, no transverse electric fields act on the liquid crystal molecules 51 in a pretilted state in the areas where the steps are formed when an off voltage is applied. The liquid crystal device 100 thus causes no light leakage contributing to a decrease in contrast when an off voltage is applied.

In the liquid crystal device 100 according to this embodiment, additionally, the liquid crystal molecules 51 have negative dielectric anisotropy and are aligned perpendicularly to the surfaces of the substrates 10 and 20. These liquid crystal molecules 51 are tilted toward the direction parallel to the surfaces of the substrates 10 and 20 by applying a voltage for optical modulation. The liquid crystal device 100 causes little light leakage in black display and can provide a high-contrast display. In addition, the dielectric protrusions 191 to 193 are formed in the transmissive display regions T and the reflective display region R to control the alignment of the liquid crystal molecules 51. The liquid crystal molecules 51 can thus be tilted in all directions (360°) in the transmissive display regions T and the reflective display region R by applying a voltage. Accordingly, no misalignment occurs in the transmissive display regions T or the reflective display region R. The liquid crystal device 100 can therefore provide a high-quality, wide-viewing-angle display with no afterimage or grainy, stain-like irregularities. Furthermore, the thickness-adjusting layer 25 is provided so that the liquid crystal layer 50 is thinner in the reflective display region R than in the transmissive display regions T. The thickness-adjusting layer 25 can eliminate the difference in retardation ($\Delta n \cdot d$) between the transmissive display regions T and the reflective display region R to achieve high contrast for both transmissive display and reflective display.

Second Embodiment

Figure 5:
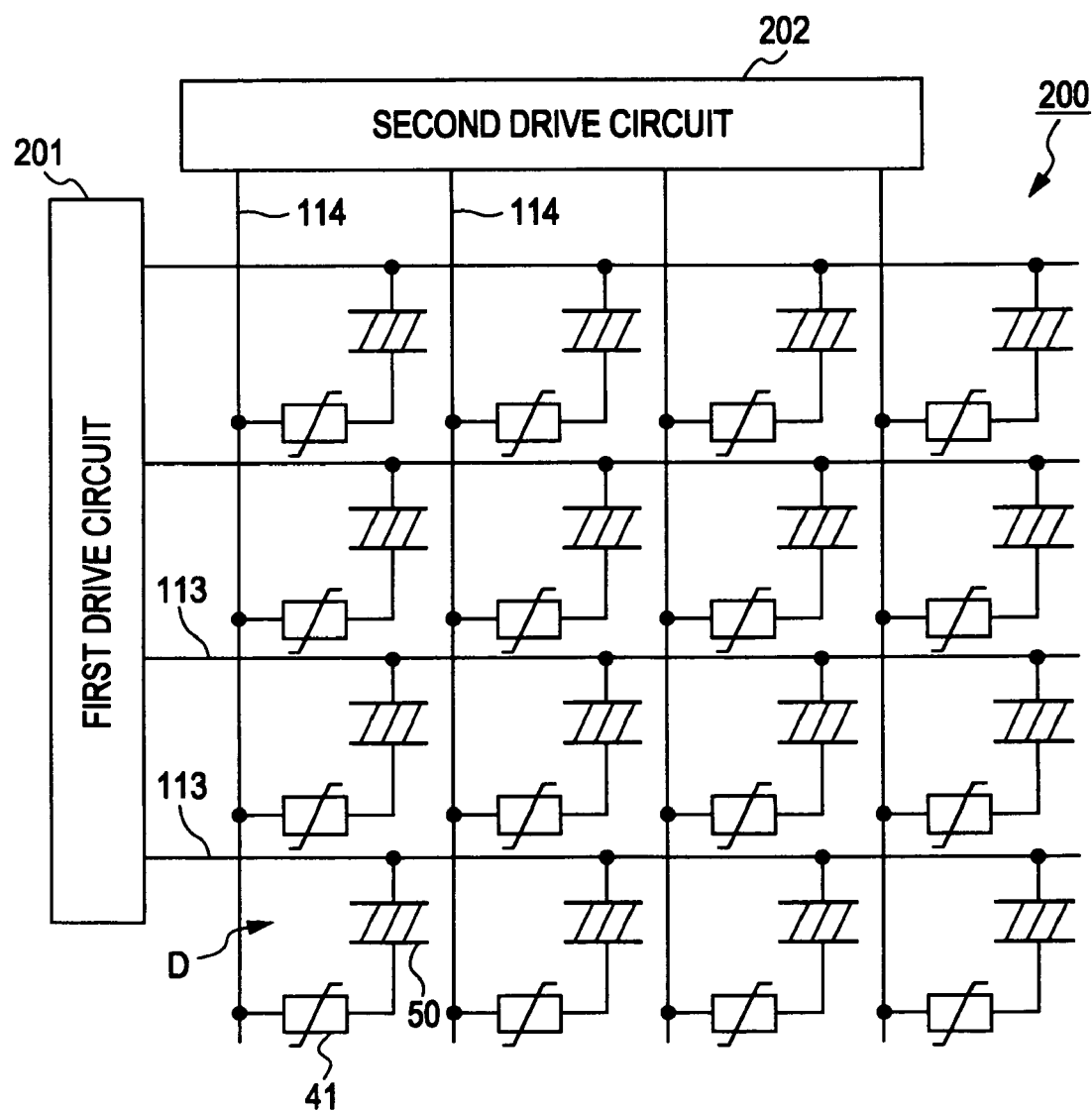
FIG. 5 is a circuit diagram of a liquid crystal device according to a second embodiment of the invention.
Figure 6:
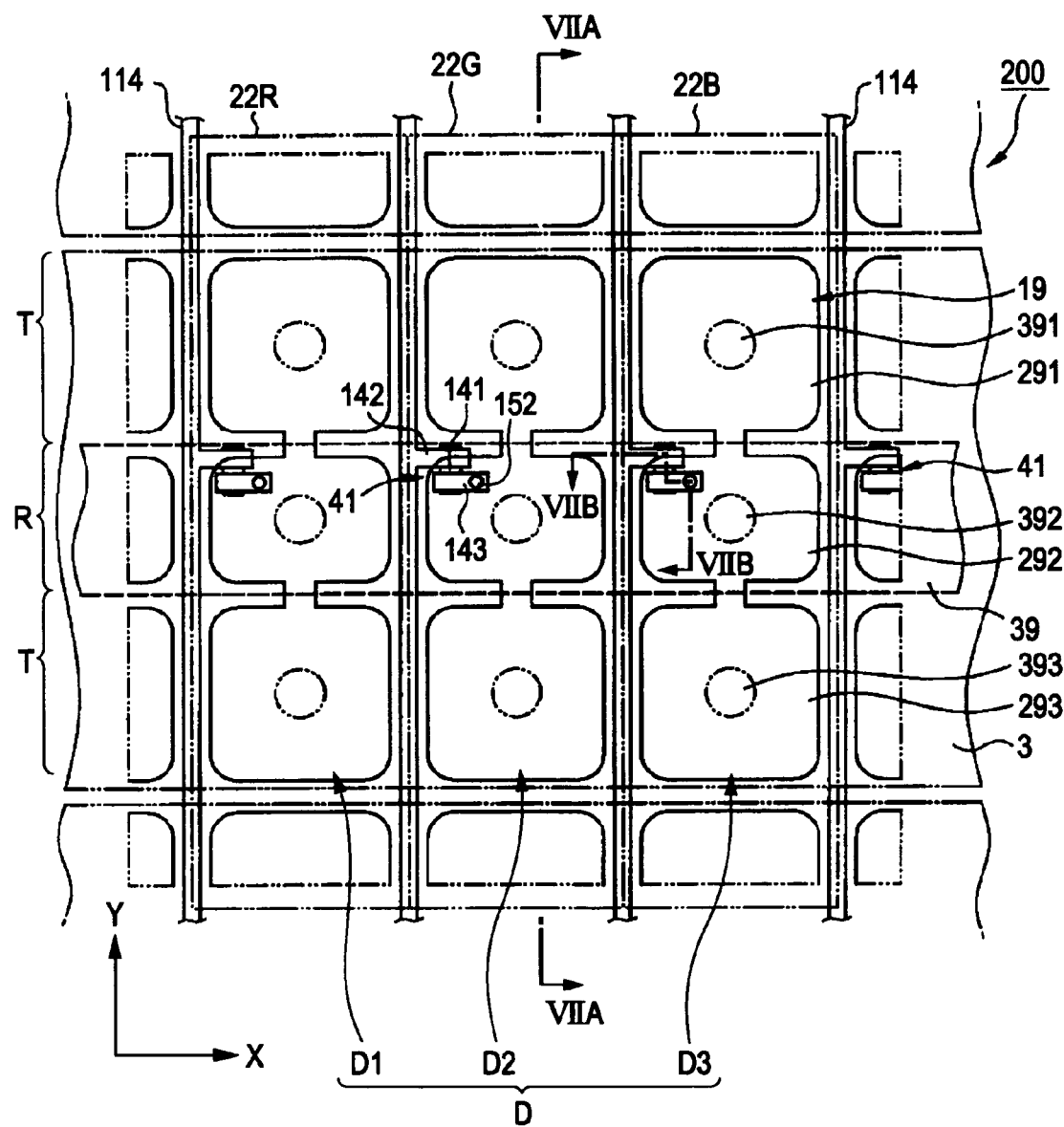
FIG. 6 is a plan view of subpixels of the liquid crystal device.
Figure 7A:
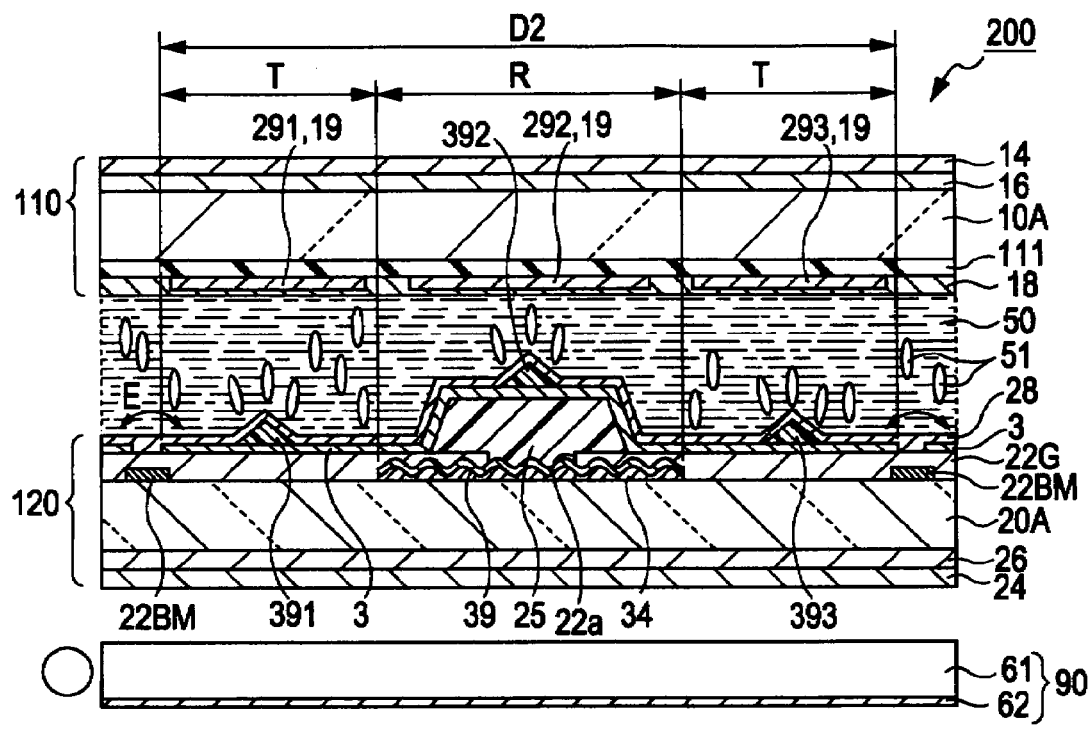
FIGS. 7A and 7B are sectional views of the subpixels and a TFD, respectively, shown in FIG. 6.
Figure 7B:
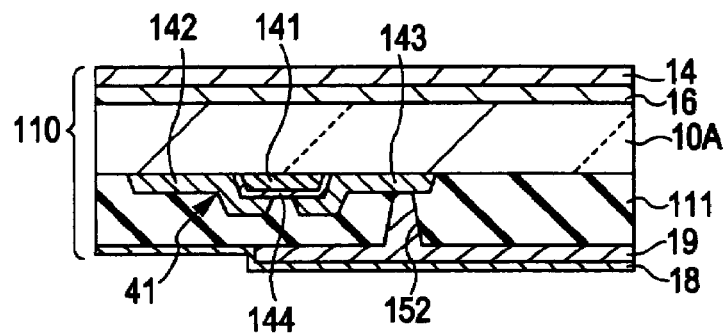

A liquid crystal device according to a second embodiment of the invention will now be described with reference to FIGS. 5, 6, 7A, and 7B. FIG. 5 is a circuit diagram of the liquid crystal device according to this embodiment. FIG. 6 is a plan view of three subpixels included in any pixel of the liquid crystal device according to this embodiment. FIGS. 7A and 7B are partial sectional views taken along lines VIIA-VIIA and VIIB-VIIB, respectively, in FIG. 6. In FIGS. 5, 6, 7A, and 7B, components similar to those of the liquid crystal device 100 shown in FIGS. 1 to 4 are indicated by the same reference numerals, and the detailed description thereof will be omitted.

A liquid crystal device 200 according to this embodiment is an active-matrix liquid crystal device including TFDs (two-terminal nonlinear elements) 41. The liquid crystal device 200, as well as the liquid crystal device 100 according to the first embodiment, is a transflective liquid crystal device having a multigap structure. Referring to FIG. 7A, the liquid crystal device 200 includes an element substrate 110 on the viewer side and a counter substrate 120 on the backlight 90 side with a homeotropic liquid crystal layer 50 having negative dielectric anisotropy held therebetween. A thickness-adjusting layer 25 is formed on part of the inner surface of the counter substrate 120 to vary the thickness of the liquid crystal layer 50 at that part.

In the circuit diagram of FIG. 5, the liquid crystal device 200 includes a first drive circuit (scanning-line drive circuit) 201 and a second drive circuit (data-line drive circuit) 202. The liquid crystal device 200 also includes scanning lines 113 and data lines 114 extending across the scanning lines 113. The first drive circuit 201 drives the scanning lines 113 while the second drive circuit 202 drives the data lines 114. The liquid crystal device 200 has subpixels D (see FIG. 6), each including a TFD 41 and a liquid crystal display element (liquid crystal layer) 50 that are connected in series between the scanning lines 113 and the data lines 114. The TFDs 41 and the display elements 50 are connected to the data lines 114 and the scanning lines 113, respectively, in FIG. 5, although they may be connected in a reverse manner; that is, the TFDs 41 and the display elements 50 may be connected to the scanning lines 113 and the data lines 114, respectively.

Referring to FIG. 6, the liquid crystal device 200 according to this embodiment includes pixel electrodes 19 and counter electrodes 3. The pixel electrodes 19 are arranged in a matrix in plan view and are connected to the data lines 114, which extend in the Y-axis direction, via the TFDs 41. The counter electrodes 3 are formed in a stripe pattern so as to overlap two-dimensionally with the rows of the pixel electrodes 19 in the X-axis direction. The counter electrodes 3 correspond to the scanning lines 113.

In FIG. 6, subpixels D1 to D3 are formed in the individual regions where the pixel electrodes 19 are formed. The subpixels D1 to D3 include the TFDs 41 to enable display for each subpixel and are provided with color filters of the three primary colors, namely, color filters 22R, 22G, and 22B, respectively, to define a single pixel. The color filters 22R, 22G, and 22B, as described above, are arranged in a stripe pattern extending in the longitudinal direction of the subpixels D1 to D3 (in the Y-axis direction in FIG. 6). A light-shielding layer 22BM extends along the boundaries between the color filters 22R, 22G, and 22B and those between the subpixels D adjacent in the longitudinal direction thereof. The light-shielding layer 22BM is formed of, for example, a black resin (see FIG. 7A).

In each of the subpixels D1 to D3, the pixel electrode 19 includes three island portions 291 to 293 similar to those of the liquid crystal device 100, being arranged in the direction in which the data lines 114 extend. These island portions 291 to 293 are coupled by narrow strips formed of conductive films. The central island portion 292 is electrically connected to the TFD 41 through a contact hole 152. A reflective layer 39 extends across the central island portions 292 arranged in the X-axis direction. The reflective layer 39 is formed of, for example, a reflective metal film such as an Al film. The regions where the reflective layer 39 overlaps two-dimensionally with the island portions 292 correspond to reflective display regions R. The regions where the other island portions 291 and 293 are formed correspond to transmissive display regions T where the reflective layer 39 is not formed. Dielectric protrusions 391 to 393 are disposed substantially in the centers of the island portions 291 to 293, respectively.

The TFDs 41 are switching elements for electrically connecting the pixel electrodes 19 to the data lines 114. The TFDs 41 have a metal-insulator-metal (MIM) structure, each including a first conductive film 141 formed of a metal film such as a tantalum (Ta) film, an insulating film 144 (not shown in FIG. 6; see FIG. 7B) mainly containing $TaO_x$ which is formed on the first conductive film 141, and second conductive films 142 and 143 mainly containing chromium (Cr) which are formed on the insulating film 144. The first conductive film 141 is an island-like conductive film having a substantially rectangular shape in plan view. The second conductive film 142 extends from the data lines 114 to the top of the first conductive film 141. The second conductive film 143 is an island-like conductive film having a substantially rectangular shape in plan view and extending from the top of the first conductive film 141 to the center of the island portion 292.

In the sectional view of FIG. 7, the element substrate 110 and the counter substrate 120 are separated by the liquid crystal layer 50, with the backlight 90 disposed on the outside of the counter substrate 120 (on the side facing away from the liquid crystal layer 50). The element substrate 110 includes a base 10A, an interlayer insulating film 111 formed on the inner surface of the base 10A, the pixel electrodes 19 (the island portions 291 to 293) on the interlayer insulating film 111, a homeotropic alignment film 18 covering the pixel electrodes 19, a retardation plate 16 disposed on the outer surface of the base 10A, and a polarizer 14 disposed on the retardation plate 16.

The counter substrate 120 includes a base 20A. An organic film 34 having an irregular surface is formed on part of the inner surface of the base 20A in the area corresponding to the reflective display region R. The reflective layer 39 is formed on the organic film 34. The reflective layer 39 has an irregular surface similar to that of the organic film 34 to function as a light-scattering reflective layer.

The color filter 22G has an opening 22a and partially covers the reflective layer 39. A thickness-adjusting layer 25 is disposed on the color filter 22G in the area where the reflective layer 39 is formed, which corresponds to the reflective display region R. The thickness-adjusting layer 25 is formed in a strip shape overlapping two-dimensionally with the reflective layer 39 in the X-axis direction of FIG. 6. The thickness-adjusting layer 25 has tapered steps at the edges thereof in the width direction (in the Y-axis direction). These tapered steps are located within the area where the reflective layer 39 is formed. The opening 22a of the color filter 22G is filled with the thickness-adjusting layer 25.

The counter electrode 3 is formed on the color filter 22G and the thickness-adjusting layer 25. This counter electrode 3 is formed in a strip shape in plan view which extends perpendicularly to the paper. The dielectric protrusions 391 to 393 are disposed at predetermined positions on the counter electrode 3 (the positions opposite the centers of the island portions 291 to 293) so as to protrude to the liquid crystal layer 50 side. A homeotropic alignment film 28 is formed over the counter electrode 3 and the dielectric protrusions 391 to 393. A retardation plate 26 and a polarizer 24 are formed on the outer surface of the base 20A in that order.

FIG. 7B illustrates the sectional structure of the TFD 41 included in each of the subpixels D1 to D3. The first conductive film 141 faces the second conductive films 142 and 143 with the insulating film 144 disposed therebetween. The interlayer insulating film 111 covers the TFD 41 formed on the base 10A. The interlayer insulating film 111 is formed of, for example, silicon oxide. The interlayer insulating film 111 has the contact hole 152, which penetrates the film 111 to reach the second conductive film 143 so that the TFD 41 is electrically connected to the pixel electrode 19 through the contact hole 152.

The liquid crystal device 200 having the structure described above operates by horizontal line inversion driving in this embodiment. Referring to FIG. 4, the scanning signals (com) applied to the scanning lines 113 are reversed in polarity for each frame, and the scanning signals (com) applied to the scanning lines 113 adjacent in the direction in which the data lines 114 extend have opposite polarities. That is, the polarity of the nth scanning signal com(n) is always opposite that of the (n+1)th scanning signal com(n+1), and thus the scanning signals com applied to the subpixels D adjacent in the direction in which the data lines 114 extend always have opposite polarities. The liquid crystal device 200 can also operate by dot inversion driving, in which the scanning signals applied to the adjacent subpixels D have opposite polarities. Such driving methods allow the liquid crystal device 200 to provide a high-quality image with no flicker.

In the liquid crystal device 200 according to this embodiment, any subpixel D includes the transmissive display regions T at the ends thereof in the longitudinal direction, that is, in the direction in which the data lines 114 extend (in the Y-axis direction), with the reflective display region R disposed therebetween. Thus, the subpixels D are adjacently arranged in the Y-axis direction with the transmissive display regions T thereof facing each other. The liquid crystal layer 50 can have a substantially uniform thickness at the boundaries between the subpixels D because the edges of the thickness-adjusting layer 25, and thus the tapered steps thereof, are not located there.

The liquid crystal device 200, as described above, can operate by line inversion driving or dot inversion driving. In such driving, transverse electric fields E occur between the adjacent counter electrodes 3 when an off voltage is applied, as shown in FIG. 7A. The transverse electric fields E largely tilt the liquid crystal molecules 51 and thus decrease contrast at the boundaries between the subpixels D if the tapered steps are located there. The thickness of the liquid crystal layer 50 varies at the tapered steps, where the liquid crystal molecules 51 are in a pretilted state. For the liquid crystal device 200 according to this embodiment, the tapered steps are not located at the boundaries between the subpixels D, where the liquid crystal layer 50 has a uniform thickness. The transverse electric fields E therefore do not largely tilt the liquid crystal molecules 51 at the boundaries. The liquid crystal device 200 can thus effectively prevent a decrease in contrast due to light leakage at the boundaries.

The tapered steps formed at the edges of the thickness-adjusting layer 25 are located between the adjacent island portions 291 and 292 and the adjacent island portions 292 and 293. The island portions 291 to 293 have the same potential because they are electrically connected to each other. In this embodiment, therefore, no transverse electric fields act on the liquid crystal molecules 51 in a pretilted state in the areas where the steps are formed when an off voltage is applied. The liquid crystal device 200 thus causes no light leakage contributing to a decrease in contrast when an off voltage is applied.

In the liquid crystal device 200 according to this embodiment, additionally, the liquid crystal molecules 51 have negative dielectric anisotropy and are aligned perpendicularly to the surfaces of the substrates 110 and 120. These liquid crystal molecules 51 are tilted toward the direction parallel to the surfaces of the substrates 110 and 120 by applying a voltage for optical modulation. The liquid crystal device 200 causes little light leakage in black display and can provide a high-contrast display. In addition, the dielectric protrusions 391 to 393 are formed in the transmissive display regions T and the reflective display region R to control the alignment of the liquid crystal molecules 51. The liquid crystal molecules 51 can thus be tilted in all directions (360°) in the transmissive display regions T and the reflective display region R by applying a voltage. Accordingly, no misalignment occurs in the transmissive display regions T or the reflective display region R. The liquid crystal device 200 can therefore provide a high-quality, wide-viewing-angle display with no afterimage or grainy, stain-like irregularities. Furthermore, the thickness-adjusting layer 25 is provided so that the liquid crystal layer 50 is thinner in the reflective display region R than in the transmissive display regions T. The thickness-adjusting layer 25 can eliminate the difference in retardation (Δn·d) between the transmissive display regions T and the reflective display region R to achieve high contrast for both transmissive display and reflective display.

Third Embodiment

Figure 8:
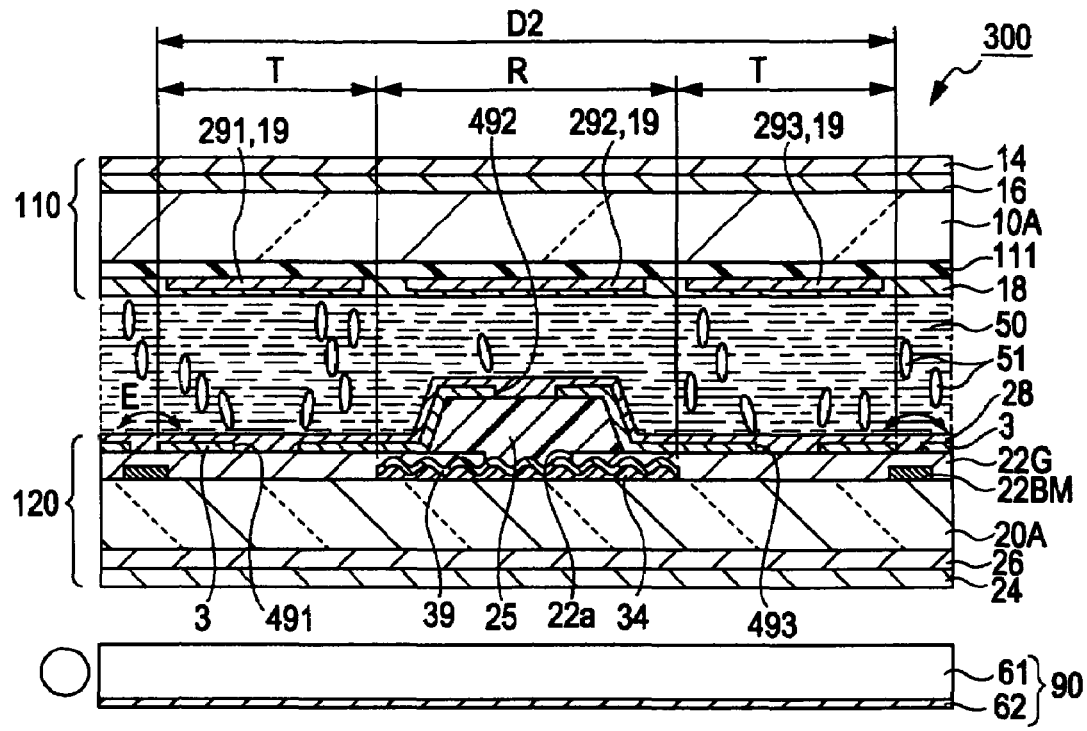
FIG. 8 is a sectional view of subpixels of a liquid crystal device according to a third embodiment of the invention.

Next, a third embodiment of the invention will be described below with reference to FIG. 8. A liquid crystal device 300 shown in FIG. 8 is a modification of the liquid crystal device 200 according to the second embodiment shown in FIGS. 5, 6, 7A, and 7B. The liquid crystal device 300 differs from the liquid crystal device 200 only in the alignment control members used for controlling the alignment of the liquid crystal layer 50. In FIG. 8, components similar to those of the liquid crystal device 200 according to the second embodiment are indicated by the same reference numerals, and the detailed description thereof will be omitted.

Referring to FIG. 8, electrode slits 491 to 493 are formed in the counter electrode 3 disposed on the counter substrate 120 of the liquid crystal device 300 by partially removing the counter substrate 120. The electrode slits 491 to 493 are substantially circular in plan view and function to control the alignment of the liquid crystal layer 50. The electrode slits 491 to 493 are located at positions opposite the centers of the island portions 291 to 293 of the pixel electrodes 19, as in the case of the dielectric protrusions 391 to 393 of the liquid crystal device 200 according to the second embodiment. The electrode slits 491 to 493 allow the liquid crystal molecules 51 to be tilted in all directions around the electrode slits 491 to 493 when a voltage is applied.

The liquid crystal device 300 according to this embodiment, as described above, has the electrode slits 491 to 493 instead of the dielectric protrusions 391 to 393, which protrude from the counter substrate 120 to the liquid crystal layer 50 side. The electrode slits 491 to 493 can be formed in the patterning of the counter electrode 3 to reduce the number of production steps, thus achieving cost reduction. In addition, the liquid crystal device 300 has no dielectric protrusions and thus causes no light leakage from therearound. The liquid crystal device 300 can therefore achieve a lower black level and higher contrast. Naturally, the liquid crystal device 300 according to this embodiment can provide the same advantages and operation as the liquid crystal device 200 according to the second embodiment.

Electronic Apparatus

Figure 9:
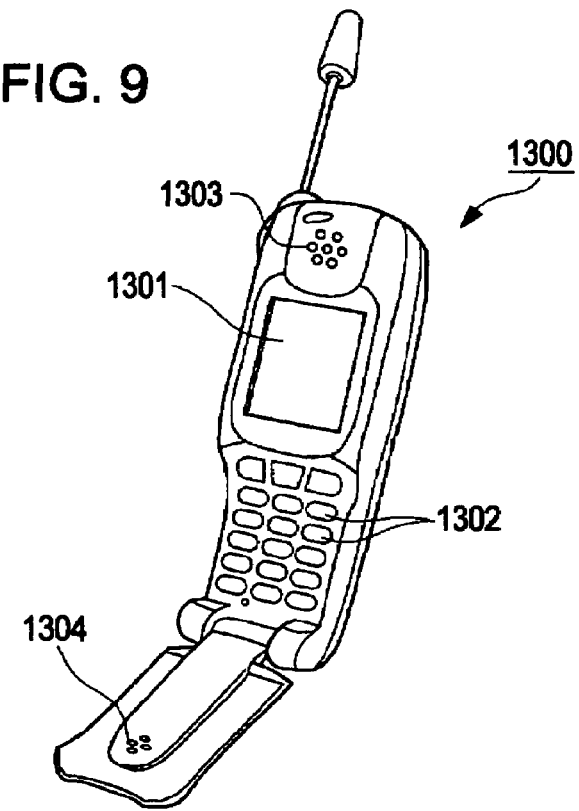
FIG. 9 is a perspective view of an example of an electronic apparatus.

FIG. 9 is a perspective view of an example of an electronic apparatus including a liquid crystal device according to an embodiment of the invention. In FIG. 9, a cell phone 1300 has a compact display 1301 including the liquid crystal device according to the embodiment of the invention, a plurality of operation buttons 1302, an earpiece 1303, and a mouthpiece 1304.

The liquid crystal devices according to the embodiments described above are suitable as displays for electronic apparatuses such as cell phones, electronic books, PCs, digital still cameras, LCD television sets, viewfinder- or monitor-equipped camcorders, car navigation systems, pagers, electronic organizers, calculators, word processors, work stations, videophones, POS terminals, and touch-panel-equipped devices. The liquid crystal devices can provide a transmissive/reflective display with high brightness, high contrast, and a wide viewing angle in such applications.

The entire disclosure of Japanese Patent Application No: 2005-328440, filed Nov. 14, 2005 is expressly incorporated by reference herein.

What is claimed is:

1. A liquid crystal device comprising:
    a pair of substrates;
    a liquid crystal layer held between the substrates and containing a liquid crystal having negative dielectric anisotropy, the liquid crystal layer including pixels, each pixel including three subpixels, each subpixel including a plurality of transmissive display regions and a reflective display region that are arranged in a predetermined direction, the transmissive display regions being disposed at the ends of each subpixel in the direction in which the transmissive and reflective display regions are arranged;
    a thickness-adjusting layer disposed between at least one of the substrates and the liquid crystal layer so that the liquid crystal layer is thinner in the reflective display region than in the transmissive display regions;
    wherein each subpixel is divided into three adjacent island portions, the island portions consisting of a center island portion and two outer island portions, the center island portion being formed in the reflective display region and each one of the outer island portions being formed in one of the transmissive display regions, such that the center island portion is sandwiched between the outer island portions, and the center island portion is electrically connected to each one of the adjacent outer island portions;
    a plurality of signal lines disposed on one of the substrates so as to extend in the direction in which the transmissive and the reflective display regions are arranged; and
    pixel-switching elements disposed in the reflective display regions of the subpixels to electrically connect the signal lines to the subpixels.

2. The liquid crystal device of claim 1, further comprising a pixel drive unit that drives the subpixels by applying signals of opposite polarities to the subpixels adjacent in the direction in which the transmissive and reflective display regions are arranged.

3. The liquid crystal device of claim 1, further comprising alignment control members corresponding to the individual island electrodes to control an alignment of the liquid crystal layer.

4. The liquid crystal device of claim 3, further comprising conductive connection portions that electrically connect the pixel-switching elements to the island electrodes in the reflective display regions, the conductive connection portions overlapping two-dimensionally with the alignment control members in the reflective display regions.

5. The liquid crystal device of claim 4, wherein the conductive connection portions and the alignment control members are disposed substantially in centers of the island electrodes in the reflective display regions.

6. The liquid crystal device of claim 1, further comprising:
    two-terminal nonlinear pixel-switching elements disposed on one of the substrates in the reflective display regions of the subpixels, the pixel-switching elements being electrically connected to the island electrodes to electrically connect the signal lines to the subpixels; and counter electrodes disposed on an other one of the substrates opposite the island electrodes with the subpixels defined therebetween, the counter electrodes being arranged in a stripe pattern.

7. The liquid crystal device of claim 6, further comprising a pixel drive unit that drives the subpixels by inputting signals of opposite polarities to the counter electrodes adjacent in the direction in which the signal lines extend.

8. The liquid crystal device of claim 1, further comprising:
a plurality of first signal lines disposed on one of the substrates so as to extend in the direction in which the transmissive and reflective display regions are arranged;
a plurality of second signal lines disposed on the substrate so as to extend across the first signal lines;
thin-film transistors disposed at positions on the one of the substrates which corresponds to intersections of the first and second signal lines in the reflective display regions of the subpixels, the thin-film transistors being electrically connected to the island electrodes to electrically connect the first signal lines to the subpixels; and
a common electrode disposed on the other one of the substrates opposite the island electrodes with the subpixels defined therebetween.

9. The liquid crystal device of claim 8, further comprising a pixel drive unit that drives the subpixels by inputting signals of opposite polarities to the adjacent second signal lines, the second signal lines being connected to the gates of the thin-film transistors.

10. The liquid crystal device of claim 8, further comprising a pixel drive unit that drives the subpixels by inputting signals of opposite polarities to any subpixel and the subpixels adjacent thereto in the direction in which the first signal lines extend and in the direction in which the second signal lines extend.

11. The liquid crystal device of claim 6, further comprising an interlayer insulating film disposed between the island electrodes and the pixel-switching elements on the one of the substrates on which the signal lines are disposed, the interlayer insulating film having a contact hole penetrating the film to electrically connect the pixel-switching elements to the island electrodes.

12. An electronic apparatus comprising the liquid crystal device of claim 1.

13. The liquid crystal device of claim 1, the subpixels further comprising adjacent island portions, tapered steps being formed at edges of the thickness-adjusting layer and located between the adjacent island portions.

* * * * *